(12) United States Patent
L'Hermite (10) Patent No.: US 6,477,066 B2
(45) Date of Patent: Nov. 5, 2002

(54) METHOD AND APPARATUS FOR REDUCING AUDIBLE ACOUSTICAL NOISE IN A POWER SUPPLY TRANSFORMER BY SHAPING THE WAVEFORM OF A PRIMARY SIDE INDUCTOR CURRENT

(75) Inventor: Francois L'Hermite, Lasserre (FR)

(73) Assignee: Semiconductor Components Industries LLC, Phoenix, AZ (US)

(*) Notice: Subject to any disclaimer, the term of this patent is extended or adjusted under 35 U.S.C. 154(b) by 0 days.

(21) Appl. No.: 09/822,741

(22) Filed: Apr. 2, 2001

(65) Prior Publication Data

US 2002/0080628 A1 Jun. 27, 2002

(30) Foreign Application Priority Data

Dec. 21, 2000 (EP) .............................. 00403643

(51) Int. Cl.$^7$ ................................. H02M 1/12
(52) U.S. Cl. ......................................... 363/41
(58) Field of Search .............................. 363/39, 40, 41, 363/42, 55, 56.01

(56) References Cited

U.S. PATENT DOCUMENTS 4,135,590 A * 1/1979 Gaulder ...................... 179/1 P
5,530,878 A * 6/1996 Bauer et al. ................. 395/750

FOREIGN PATENT DOCUMENTS

| JP | 4121056 | 4/1992 |
|---|---|---|
| JP | 8009636 | 1/1996 |
| JP | 0248256 | 9/1998 |
| WO | 9508213 | 12/1993 |
| WO | 0070730 | 11/2000 |

* cited by examiner

Primary Examiner—Adolf Deneke Berhane (57) ABSTRACT

An apparatus for reducing audible noise in a power supply (16) is provided. The apparatus comprises a shaper circuit (258) located on the secondary side (204) of a transformer (200) that is operable to control the shape of the current through a primary side inductor (222). By changing the shape of the current, acoustical noise is reduced in the transformer (200).

18 Claims, 6 Drawing Sheets

METHOD AND APPARATUS FOR REDUCING AUDIBLE ACOUSTICAL NOISE IN A POWER SUPPLY TRANSFORMER BY SHAPING THE WAVEFORM OF A PRIMARY SIDE INDUCTOR CURRENT

FIELD OF THE INVENTION

This invention relates to power supplies and more specifically, to a method and apparatus for reducing audible noise in a power supply transformer.

BACKGROUND OF THE INVENTION

Today many electronic devices require one or more sources of stable DC voltage. This has lead to a demand for improved power supplies to perform the basic function of rectifying AC voltage to DC voltage, filtering the DC voltage to reduce the undesirable remaining AC portion of the rectified waveform and regulating to insure the output voltage is insensitive to variations in the input voltage.

One type of power supply regulator is a switch mode regulator. Switch mode regulators utilize switching to regulate the amount of energy transferred from the input through an inductor to the output lead. Switch mode regulators tend to be efficient, compact and lightweight.

One drawback of switch mode regulators is that they can produce audible noise. This occurs when the core of an inductor of the transformer in a switch mode power supply changes size when current sent through the inductor coil rapidly changes. This is known as magnetostriction. Because switch mode regulators typically have a periodic current in standby mode, a resonance can occur whereby magnetostriction causes a mechanical interaction between the core and the windings of the inductor that leads to a vibration. This vibration causes an audible noise to emanate from the power supply. This is undesirable, especially when the power supply is in standby mode and is powering in home appliances, such as a television.

Thus, what is needed is a way to reduce audible noise in the transformer of a switch mode power supply.

BRIEF DESCRIPTION OF THE DRAWINGS

For a more complete understanding of the present invention and advantages thereof, reference is now made to the following descriptions, taken in conjunction with the following drawings, in which like reference numerals represent like parts, and in which.

DETAILED DESCRIPTION OF THE DRAWINGS

Figure 1:
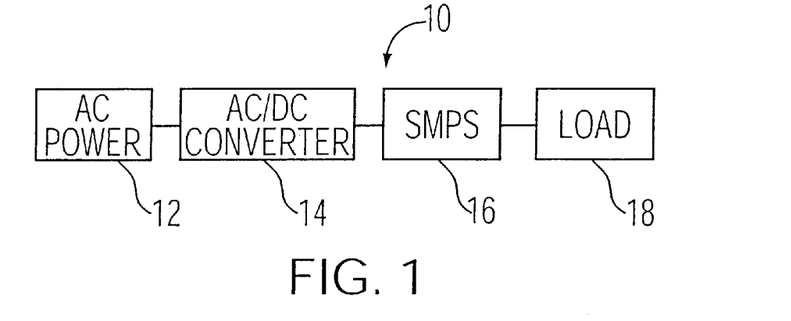
FIG. 1 illustrates an electrical system in accordance with the teachings of the present invention.

FIG. 1 illustrates an electrical system in accordance with the teachings of the present invention. Illustrated is a source of AC power 12, an AC/DC converter 14, a switch mode power supply 16 and a load 18. In operation, AC power supply 12 supplies AC voltage to AC/DC converter 14 which, in a typical embodiment, converts the AC voltage to a DC voltage using a diode network. AC power can be supplied by household current. Switch mode power supply 16 performs the rectifying and filtering steps which rectifies and smoothes the waveform. Also, based on a feedback signal, a controller operates a switch to control the inductor charge and discharge duty cycle so as to supply the desired output voltage to the load 18. This operation is well known in the art. The present invention is an improved transformer within the switch mode power supply 16 to smooth out the current in the primary winding during standby mode to avoid acoustic noise caused by magnetostriction.

Figure 2:
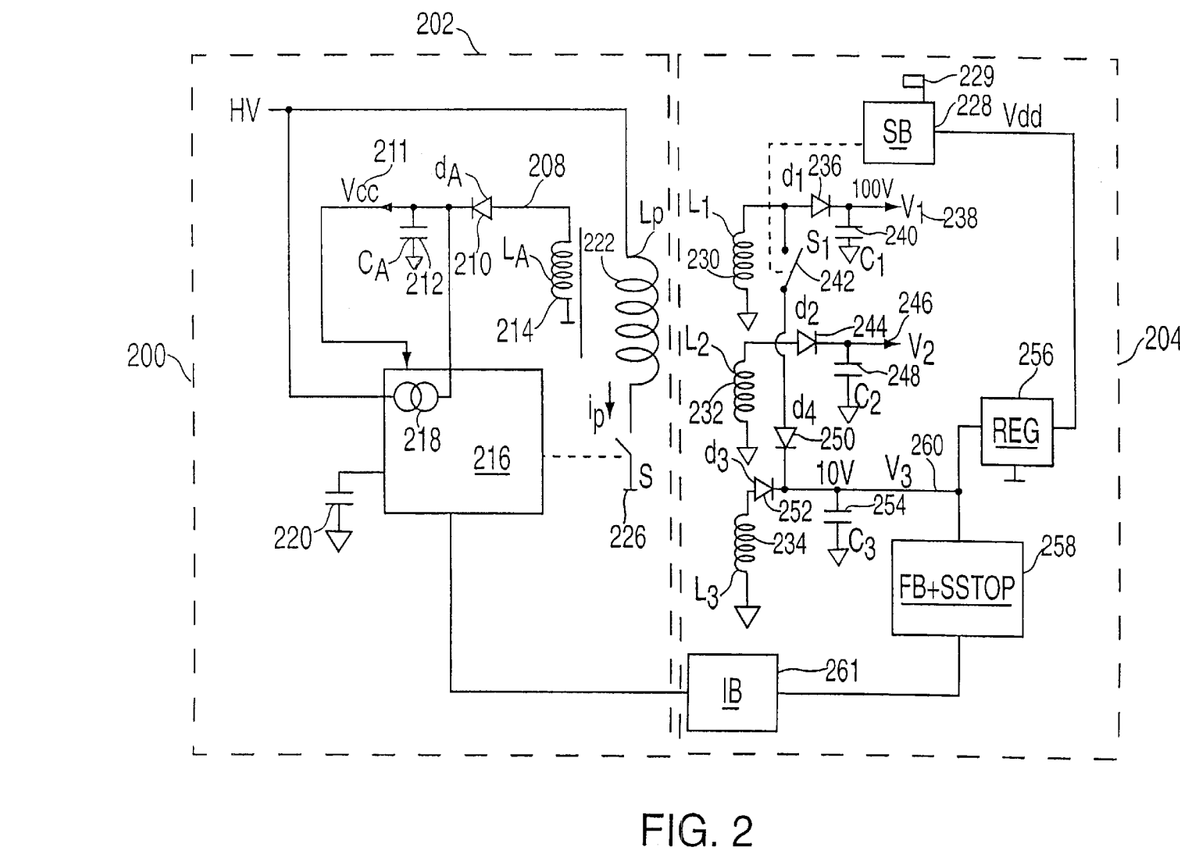
FIG. 2 illustrates a detailed diagram of a transformer for a switch mode power supply in accordance with the teachings of the present invention.

FIG. 2 illustrates a detailed diagram of the transformer 200 of switch mode power supply 16 in accordance with the teachings of the present invention. Transformer 200 comprises a primary side 202 and a secondary side 204. Transformer 200 comprising primary inductor 222, a first secondary inductor 230, a second secondary inductor 232 and a third secondary inductor 234.

On the primary side 202, there is a source of high voltage 206. This is connected to a controller 216 with a current source 218. Also included is an auxiliary diode 210, an auxiliary capacitor, $C_A$ 212, a voltage, Vcc 211, used to supply voltage to controller 216, an auxiliary inductor LA 214, and a switch S 226. Switch S 226 is cycled on and off at a high frequency rate by the controller 216.

Secondary side 204 includes first secondary inductor 230, second secondary inductor 232, and third secondary inductor 234. The secondary inductors 230, 232, 234 are inductively coupled to primary inductor 222 and auxiliary inductor 214. Also included are a standby block 228 with sensor 229, a regulator block 256, a feedback and soft stop block 258 and an isolation block 260. In one embodiment, first secondary inductor 230 has $N_1$ windings, second secondary inductor 232 has $N_2$ windings, and third secondary windings 234 has $N_3$ windings. In one embodiment $N_1 > N_2 > N_3$.

In operation, Vcc 211 is present (when switch mode power supply 16 is initiated Vcc is established by current source 218) and a voltage is applied in first secondary inductor 230 by primary inductor 222, which produces a given output voltage, $V_1$ 238. In one embodiment $V_1$ is 100 volts. The voltage applied on the second secondary inductor 232 and the third secondary inductor 234 are less since second secondary inductor 232 and third secondary inductor 234 have fewer windings than first secondary inductor 230. In one embodiment $V_3$ is 10 volts. The rate of discharge of current in each secondary inductors 230, 232 and 234 is directly related to the value of the voltage coupled into the secondary inductors.

As energy stored in the primary inductor 222 drains, energy is stored in auxiliary inductor 214 and in auxiliary capacitor 212. These components act as a self supply power source for controller 216. Controller 216 controls switch S 226 in a high frequency mode. Switch S 226 will cycle open and closed at a rate, in one embodiment, of 50 kHz. When switch S 226 is closed, energy is loaded by primary inductor 222. When switch S 226 is open, energy is discharged to all secondary inductors.

The switch mode power supply 16 is switched from a normal mode to a standby mode by closing first switch S1 242 using standby block 228. This is typically done by sending a signal from a remote to sensor 229 of standby block 228. The signal could be, for example, sent to a television via a remote control to tell the television to switch to an off state (which places the television power supply switch in a standby mode). Closing switch S1 242 couples the output of first secondary inductor 230 to line 253 via diode 250. Since line 253 is at a lower voltage than first secondary inductor 230, voltage out of the secondary inductor drops. In one embodiment $V_1$ 238 drops from 100 volts to 10 volts. The reduction factor is proportional to the turn ratio between first secondary inductor 230 and third secondary inductor 234. The ratio in this example is 0.1, therefore, the voltage drop is from 100 volts to 10 volts.

Since all inductors are magnetically coupled, all the voltages applied to the inductors will drop by the same ratio. The voltage, Vcc 211, built by auxiliary inductor 214 will drop after a few milliseconds (the amount of delay is related to the auxiliary capacitor 212 and the current consumption of controller 216) of switch S1 242 closing. Once the voltage, Vcc 211, drops to too low a value, controller 216 stops controlling switch S 226 and initiates current source 218. Current source 218 charges the capacitor 212 and Vcc 211 starts to rise. When Vcc 211 reaches a sufficient level, controller 216 restarts operation of switch S 226 and disables current source 218. As before, switch S 226 will operate in a high frequency open/close mode. If the power supply is still in standby mode, auxiliary capacitor 212 does not receive any voltage from the auxiliary inductor 214. This is because the voltage on the secondary inductors are lower than during the normal mode. By the magnetic coupling between auxiliary inductor 214 and the secondary inductors, the voltage developed on auxiliary inductor 214 is lower than the normal mode value of Vcc 211. Therefore, the auxiliary diode 210 is reversed biased and no current can charge the auxiliary capacitor 212. After a few milliseconds, controller 216 stops controlling switch S 226. Once this occurs, the current source 218 is activated and the cycle continues. This switching on and off in prior art power supply produces a rectangular-shaped current pulse in primary inductor 222. The current pulse is in fact composed of the succession of the high frequency current spikes produced by the ON and OFF status of the switch S 226, (in one embodiment the primary current pulse lasts 5 to 20 milliseconds and contains nearly one thousand current spikes). The rectangular current pulse produces acoustic noise. In the present invention, other components, discussed in detail below, change the shape of the current pulse and reduces acoustical noise.

Figure 3A:
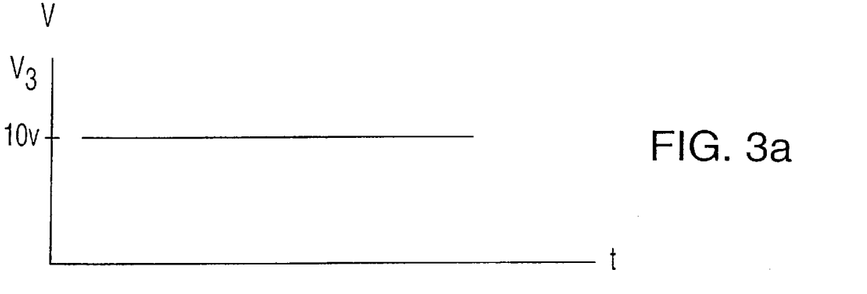
FIG. 3a, FIG. 3b and FIG. 3c illustrate waveforms of output voltage and current through the primary inductor for the circuit of FIG. 2 in standby mode.
Figure 3B:
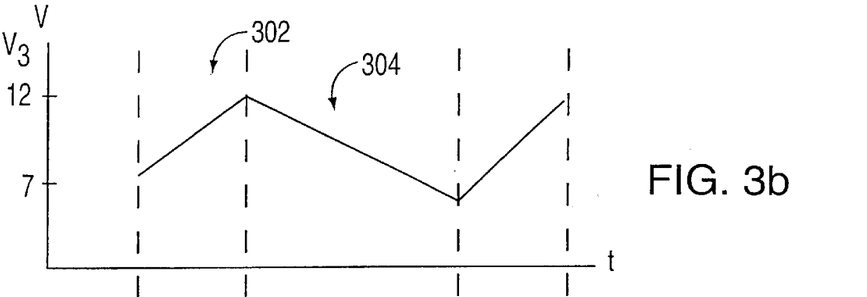
Figure 3C:
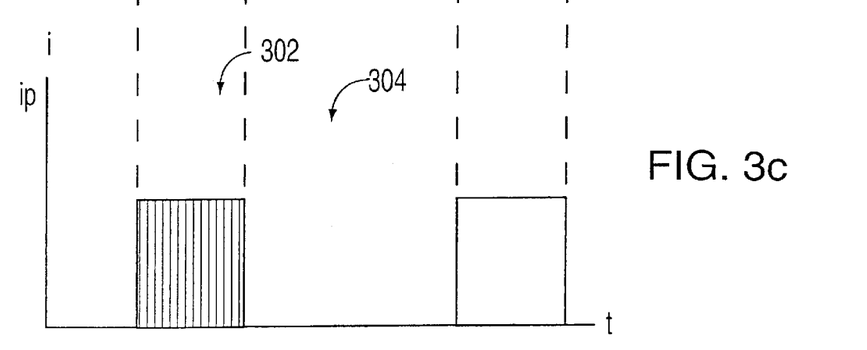

FIG. 3a illustrates a plot of output voltage $V_3$ 260 during normal mode. In normal mode, voltage $V_3$ 260 outputs a steady 10 volts. FIG. 3b illustrates voltage $V_3$ 260 during standby mode. In one embodiment, the voltage will vary between 7 volts and 12 volts. Illustrated are two sections, a first section 302 and a second section 304. First section 302 is when the system is in standby with controller 216 enabled after the current source 218 was used to charge auxiliary capacitor and the voltage $V_3$ is increasing. After a certain amount of time since the auxiliary inductor 214 is unable to charge auxiliary capacitor 212, the controller 216 stops control of switch S 226 and voltage begins to drop. This is the second section 304. This cycle continues over and over when the system is in standby mode. FIG. 3c illustrates the current through the primary inductor 222 as a function of time. In first region 302, the effect of switch S 226 is illustrated. As can be seen the current wave is rectangular in shape due to the abrupt starts and the abrupt stops of the switch mode power supply 16. This square shaped envelope is what produces the acoustical noise.

Figure 4:
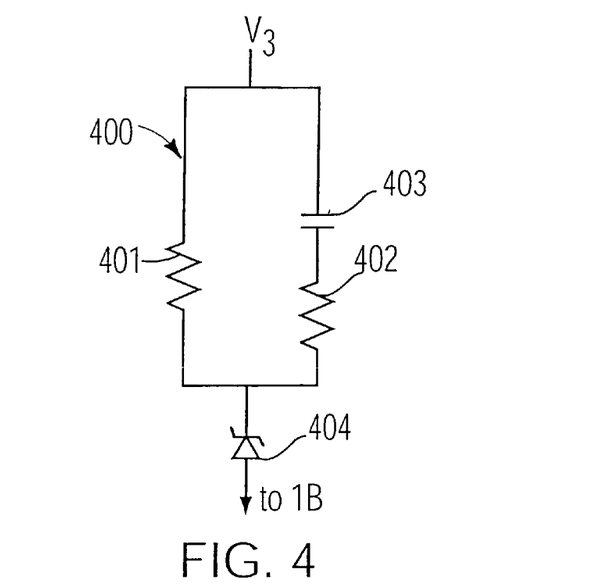
FIG. 4 illustrates an embodiment of the feedback and soft stop block of the present invention.

In the present invention, the previously rectangular shaped current pulse is smoothed for both the leading edge and the falling edge. Turning to FIG. 2, a soft-start capacitor 220 is provided and it is coupled to controller 216. This capacitor works to smooth out the leading edge of the current pulse by controlling the size of each individual current spike of the pulse. After passing through soft start capacitor, the first current spike at the beginning of the pulse has a very low level and the following spikes will rise with a soft slope up to the wished value. The slope shape can be linear, exponential, first quarter of a sinusoid or any soft rising edge shape, depending on the configuration of soft start capacitor 220. In FIG. 2 the rising slope is determined by the capacitor value charged by a constant current. This technique is well known in the art. During the start-up sequence the switch mode power supply works in an open loop configuration The falling edge of the current pulse is controlled by a feedback and soft-stop component (FB and SSTOP) 258. FIG. 4 illustrates an embodiment of FB and SSTOP 258. FIG. 4 shows voltage $V_3$ which is connected to a shaping network 400 which comprises, in this embodiment, one resistor 401 in parallel with a resistor 402 in series with a capacitor 403. This arrangement being connected to a zener diode 404 whose anode is connected to the isolation block, IB 260. In operation, zener diode 404 will not operate until a certain threshold voltage is reached. Once that threshold voltage is reached, the voltage $V_3$ will pass through shaping network 400, which will produce a smooth voltage output. In this configuration, the shape of the voltage waveform developed across 400 will be exponential. Since the network 400 is now in a closed configuration, $V_3$ will be rising with an exponential shape. Capacitor C3 performs the integration of the current pulse to produce the shape of the voltage pulse, and since the result of the integration is forced to be a rising exponential by network 400, the current pulse waveform will be a falling exponential in shape.

Thus, the leading edge of the current pulse is forced to be smooth due to the soft start capacitor and the trailing edge of the pulse is smoothed by the above discussion.

Figure 5:
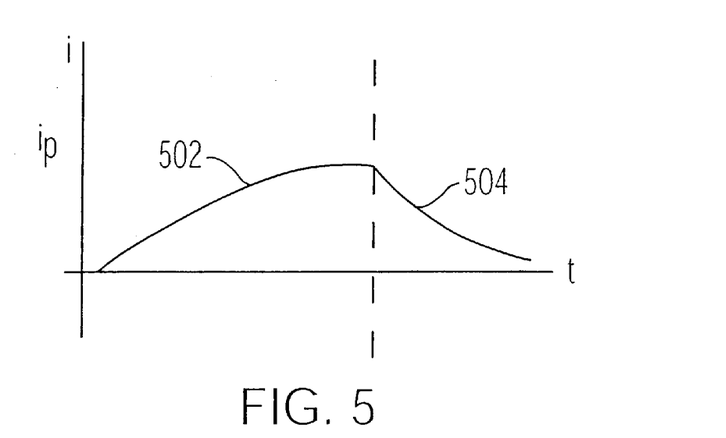
FIG. 5a is a plot of $V_3$ versus time.
FIG. 5b is a plot of current through the primary inductor versus time.

FIG. 5 illustrates the current pulse during stand by mode utilizing the FB and SSTOP 258 in FIG. 4. In section 502, the shape of the current pulse through the inductor is formed by soft start capacitor exponentially charged. In section 504, the shape is formed by shaping network 400.

Figure 6:
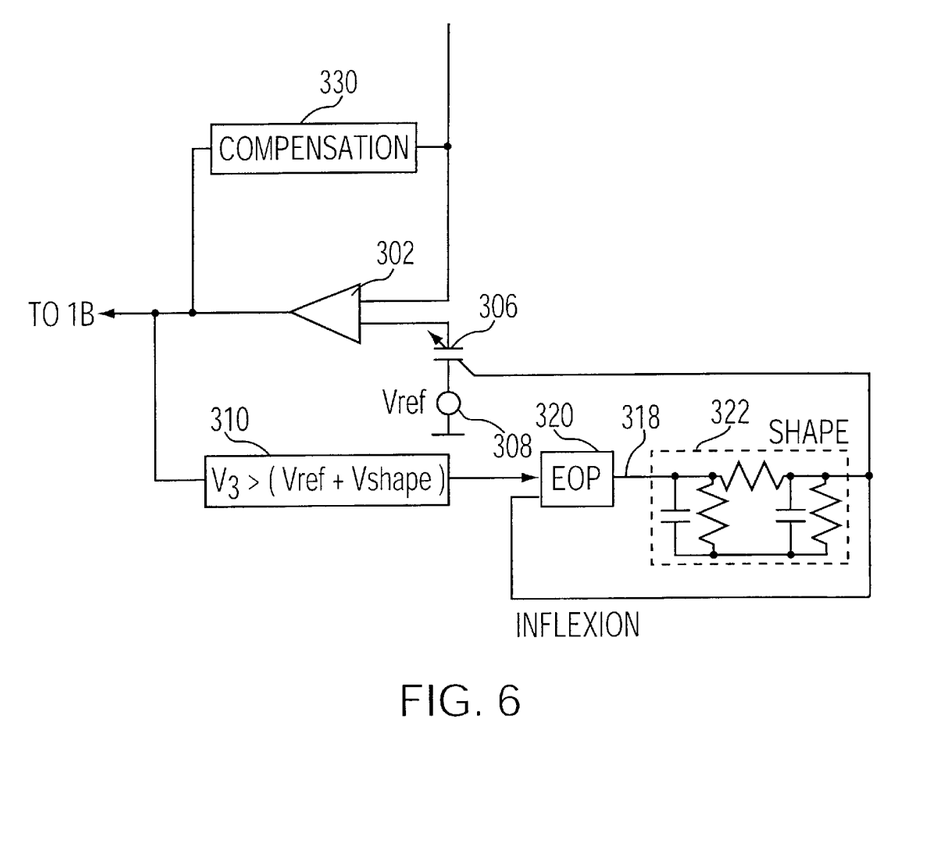
FIG. 6 illustrates an alternative embodiment of the soft-stop feedback block of the present invention.

FIG. 6 illustrates a second embodiment of FB and SSTOP block 258. FB and SSTOP block 258 includes an operational amplifier 302 that will compare the actual voltage $V_3$ output 260 of third secondary inductor 234 with a reference voltage 305 combined with a shaping voltage 304. A compensation network 330 connecting between the negative input of the operational amplifier and its output is also provided. The compensation network 330 helps to provide stability for the system while operating in a closed loop mode. The stability of switch mode power supply is ensured when the gain/phase shift of the primary side 202, the secondary side 204 and the feedback soft stop block 258 is such that a phase margin is present. If the phase margin is not met the compensation network helps providing a phase margin by introducing pole(s) and zero(s) in the transfer function of the feedback and soft stop block 258 and specifically in the compensation block 330. The poles and zeros are built using capacitors and resistors internal to compensation block 330. This compensation technique is well known to those skilled in the art.

Also provided is a voltage comparison block 310, an end of pulse block (EOP block) 320, and a shape network 312. During the falling edge sequence the switch mode power supply 16 works in a closed loop configuration. This is discussed in greater detail in conjunction with FIG. 8.

The operational amplifier 302 in FIG. 6 has one input $V_3$ 260 and has a second input a combination of a fixed voltage reference, Vref 305, plus a variable voltage known as Vshape 306. The operational amplifier allows for the closing of the switch mode power supply 16 feedback loop. In a classical switch mode power supply without the soft-stop feature the reference voltage located on the secondary side is generally constant. In that case, for example, Vshape 306 would be not present and then the voltage applied 302 would be constant., In the preferred embodiment the reference is evolving as soon as the end of pulse condition occurs. The end of pulse occurs when the condition V3>(Vref+Vshape) is reached knowing that at that very moment Vshape has a zero voltage level.

Figure 7A:
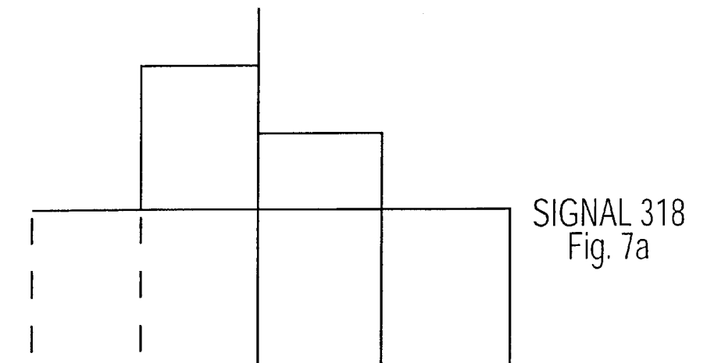
FIG. 7a is a graph of the output of the end of the pulse block.
Figure 7B:
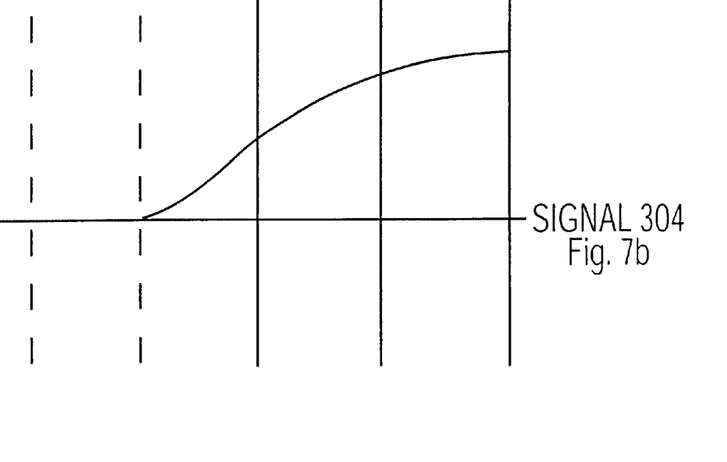
FIG. 7b is the output of the shaping network of FIG. 6 in accordance with the teachings of the present invention.

In operation, when the voltage $V_3$ 260 first exceeds VREF (at this point VSHAPE is zero), voltage comparison block 310 will send a signal 316 to EOP block 320, which will produce a square shaped signal 318 (as seen in 7a). This pulse is applied to the smoothing network 312, which will produce a smooth, quasi-cosinusoidal pulse 304 (as seen in FIG. 7b). The signal 318 is a two-level voltage signal (labeled V1 and V 2 in FIG. 7a). The block 312 performs a double integration of the two-level signal. As illustrated in FIG. 7b first portion 701 corresponds to a voltage shape starting from zero. The double integration of a constant voltage gives a rising portion of a quasi-cosine. To build the second portion 702 of the quasi-cosine waveform shown in FIG. 7b, the rising slope is reduced. To perform this slope reduction, a change from a voltage V1 down to a voltage V 2 is made. Then the double integration produces a signal which starting level is corresponding to the end of the previous with a reduced rising slope. The point where the change occurs is known as the inflexion point. The creation of the inflexion point is performed by a voltage comparison made internal to box EOP 320. Because of the closed loop condition, the FB and SSTOP block 258 forces the voltage $V_3$ to be shaped like a cosine wave, which will influence the shape of the current pulse through the primary current. The current pulse through the primary inductor 222 by magnetic coupling with the secondary inductor is also flowing in the secondary inductor L3 234. The size of the secondary current pulse is dictated by the turn ratio of the windings between the primary inductor 222 and the third secondary inductor 234. Capacitor C3 performs the integration of the current pulse to produce the shape of the voltage pulse, and since the result of the integration is forced to be cosinusoidal by network 312, the current pulse waveform will be sinusoidal in shape. The result is instead of a rectangular current pulse being formed in standby mode and causing acoustical noise, the current pulse is smooth, reducing or eliminating acoustical noise.

Figures 8A, 8B:
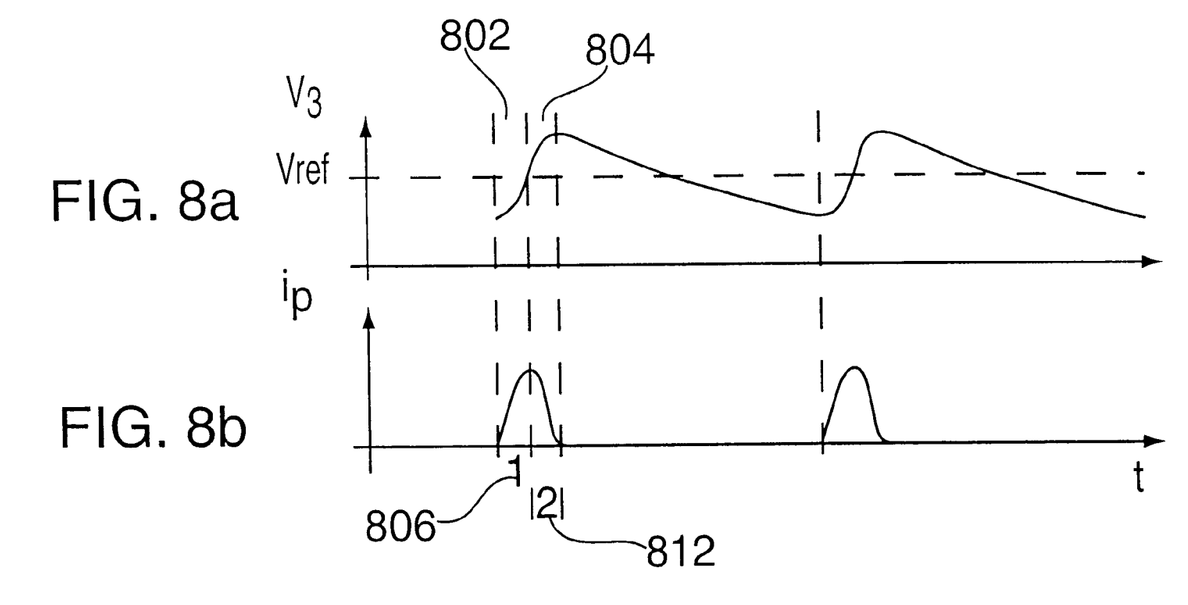
FIGS. 8a and 8b illustrates the obtained current pulse waveform relative to the use of the embodiment in FIG. 6.

FIG. 8a is a plot of output voltage V 3 versus time for standby mode and 8b illustrates the current through the primary inductor versus time. Note in FIG. 8a first region 802 and second region 804. When voltage is below Vref then the shape of the voltage (and correspondingly, the shape of the current waveform as seen in FIG. 7b at 806) is determined by the primary side (by the operation of soft start capacitor 220). This is illustrated by first region 802. When voltage rises above the reference voltage (Vref) the secondary side controls and FB and SSTOP 258 forces the voltage to be cosinusoidal in nature. This accounts for the shape of the output voltage in second region 804. This forces the primary inductor current to be sinusoidal in nature as seen in FIG. 8b, at 812. Thus, the present invention shapes the current through the primary inductor during standby mode, thus reducing or eliminating acoustic noise.

The here above described preferred embodiment is using an analog approach. It should be understood that other techniques can be used. For example a digital approach whereby a microprocessor controls the stop shape component could be used to elaborate the SHAPE waveform. Although the present invention has been described in several embodiments, a myriad of changes, variations, alterations, transformations and modifications may be suggested to one skilled in the art. For example, the components illustrated may be substituted for by other components that function similarly. It is intended that the present invention encompass such changes, variations, alterations, transformations and modifications and that they fall within the spirit and scope of the appended claims.

What is claimed is:

1. An apparatus for reducing acoustical noise in a transformer comprising shape circuit located on the secondary side of the transformer and operable to shape the waveform of a current through a primary side inductor wherein the shaper circuit further comprises:

an operational amplifier operable to compare an output voltage with a reference voltage;

an end-of-pulse block operable to initiate an end of pulse signal when the output voltage exceeds the reference voltage; and a shaper network operable to receive the end of pulse signal and produce an output signal that will shape the current pulse through the primary side inductor.

2. The apparatus of claim 1, wherein the shaper circuit comprises a shaper network coupled to a zener diode.

3. The apparatus of claim 1, wherein the shaper circuit produces an exponential shape current envelope through the primary inductor.

4. The apparatus of claim 1, wherein the shape of the current pulse through the primary side is sinusoidal.

5. The apparatus of claim 1, further comprising a soft start network operable to smoothly shape the initial part of a current pulse through the primary side inductor.

6. The apparatus of claim 1, further comprising a standby switch operable to switch from a normal mode to a standby mode.

7. A method for reducing noise in a transformer comprising:

shaping the waveform of a current through a primary side inductor until an output voltage exceeds a reference voltage using a start network on a primary side; and using a secondary side shaper to shape the waveform of the current through the primary side inductor, wherein the step of using a secondary side shaper further comprises shaping an input voltage waveform using a shaper network, and outputting a shaped voltage after the input voltage exceeds a fixed level, wherein the step of outputting a shaped voltage further comprises producing a sinusoidal shaped current through the primary inductor.

8. The method of claim 7, wherein the step of shaping the waveform further comprises using a capacitor to shape the waveform.

9. The method of claim 7, wherein the step of using a secondary side shaper further comprises:

comparing an output voltage with a reference voltage;

activating an end of pulse block when the output voltage exceeds the referencing voltage;

outputting an end-of-pulse signal; and shaping the end-of-pulse signal using a shaping network.

10. The method of claim 9, wherein the step of shaping further comprises producing a sinusoidal shaped current pulse in the inductor.

11. The method of claim 7, further comprises using a zener diode coupled to a capacitor network to shape the waveform.

12. A transformer comprising:

a primary side including:
  a primary inductor;
  a soft start capacitor operable to control the shape of a current through the primary inductor in the first part of a standby phase; and a secondary side including:
  a first secondary inductor magnetically coupled to the primary inductor;
  a second secondary inductor magnetically coupled to the primary inductor;
  a third secondary inductor magnetically coupled to the primary inductor;
  a shaper circuit operable to control the shape of a current flowing through a primary inductor in the second part of the standby phase.

13. The transformer of claim 12, wherein the shaper circuit comprises a shaper network coupled to a zener diode.

14. The transformer of claim 13, wherein the shaper circuit produces an exponential shape current envelope through the primary inductor.

15. The transformer of claim 12, wherein the shaper circuit further comprising:

a comparator for detecting the beginning of the end of a standby phase;

an end-of-pulse block operable to initiate an end of pulse signal at the beginning of the end of the standby phase; and a shaper network operable to receive the end of pulse signal and produce an output signal that will shape the current pulse through the primary side inductor.

16. The transformer of claim 15, wherein the shape of the current pulse through the primary side is cosinusoidal.

17. The transformer of claim 11, wherein the transformer is part of a switch mode power supply.

18. The transformer of claim 12, further including a controller for controlling the energy accumulation and energy discharge of the primary inductor.

* * * * *